United States Patent
Baek

(10) Patent No.: US 9,203,061 B2
(45) Date of Patent: Dec. 1, 2015

(54) RECHARGEABLE BATTERY

(75) Inventor: Woon-Seong Baek, Yongin-si (KR)

(73) Assignee: SAMSUNG SDI CO., LTD., Yongin-Si (KR)

( * ) Notice: Subject to any disclaimer, the term of this patent is extended or adjusted under 35 U.S.C. 154(b) by 607 days.

(21) Appl. No.: 13/538,668

(22) Filed: Jun. 29, 2012

(65) Prior Publication Data

US 2013/0089757 A1   Apr. 11, 2013

Related U.S. Application Data

(60) Provisional application No. 61/544,988, filed on Oct. 7, 2011.

(51) Int. Cl.
*H01M 14/00* (2006.01)
*H01M 6/12* (2006.01)
*H01M 6/46* (2006.01)
*H01M 2/00* (2006.01)
*H01M 2/04* (2006.01)
*H01M 2/10* (2006.01)

(52) U.S. Cl.
CPC .......... *H01M 2/0426* (2013.01); *H01M 2/0469* (2013.01); *H01M 2/0473* (2013.01); *H01M 2/1061* (2013.01); *H01M 2220/20* (2013.01)

(58) Field of Classification Search
USPC ............................................... 429/7, 163, 162

IPC ............................................... H01M 14/00,2/00
See application file for complete search history.

(56) References Cited

U.S. PATENT DOCUMENTS

| 6,524,732 | B1 * | 2/2003 | Iwaizono et al. ................. 429/7 |
| 8,119,281 | B2 | 2/2012 | Kim |
| 2005/0221174 | A1 | 10/2005 | Yoon |

FOREIGN PATENT DOCUMENTS

| KR | 10-2005-0096291 | 10/2005 |
| KR | 10-2009-0011994 | 2/2009 |
| KR | 10-2009-0042535 | 4/2009 |

* cited by examiner

*Primary Examiner* — Patrick Ryan
*Assistant Examiner* — Julian Anthony
(74) *Attorney, Agent, or Firm* — Knobbe Martens Olson & Bear LLP

(57) ABSTRACT

A rechargeable battery including a case, and a cap plate, a protective circuit module that is electrically connected to the bare cell. A protection element that is installed between the bare cell and the protective circuit module. A protection element cover member that is positioned between the protection element and the protective circuit module and that covers the protection element, and a protection element coupling member that is positioned between the bare cell and the protection element. The protection element is attached to the bare cell, wherein the protection element coupling member is coupled to a protrusion on the cap plate.

17 Claims, 8 Drawing Sheets

300

RECHARGEABLE BATTERY

CROSS REFERENCE TO RELATED APPLICATIONS

This application claims the benefit of U.S. Provisional Patent Application No. 61/544,988 filed Oct. 7, 2011 which is hereby incorporated by reference in its entirety herein.

BACKGROUND

1. Field

The described technology relates generally to a rechargeable battery. More particularly, the described technology relates generally to a rechargeable battery that improves a structure of a coupling member to which a protection element is coupled and a structure of a protection element.

2. Description of the Related Art

A rechargeable battery can be repeatedly charged and discharged unlike a primary battery that is incapable of being recharged. A low capacity rechargeable battery is used for a small portable electronic device such as a mobile phone, a laptop computer, and a camcorder, and a large capacity battery is used as a power source for driving a motor of a hybrid vehicle, etc., or a large capacity power storage device.

An operation voltage of the rechargeable battery is often about 3.6V and the battery may experience overcharge or over-discharge when charge and discharge cycles are repeated. When overcharge or over-discharge occurs, gas or heat occurs as a result of the decomposition of an electrolyte solution of the rechargeable battery, which can result in deterioration or damage of a performance of the rechargeable battery.

Therefore, in order to prevent overcharge or over-discharge of the rechargeable battery, a protective circuit module is mounted in the rechargeable battery.

Often, the protective circuit module includes a protective circuit board and a protection element, and the protection element is adhered on and fixed to a coupling member (e.g., a double-sided adhesive tape) that is attached on a case in which a bare cell is housed. Further, the protective circuit module includes a molding portion that is formed with an insulating resin (e.g., a resin) that is filled between the protective circuit board and the bare cell and that intercepts an electrical connection portion of the protective circuit board.

However, because the coupling member is attached to a case by adherence of adhesives that are applied on the coupling member, when outside impacts are continuously applied to the rechargeable battery or when an impact larger than adherence of the coupling member is applied to the rechargeable battery, the coupling member can be separated from the case.

Further, when a heat that is generated in a bare cell is excessively transferred to a protection element that is attached to a coupling member, the protection element may be damaged.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery having advantages including a coupling member having a structure that is less likely to be separated from a case.

The described technology further provides a rechargeable battery including a protection element having a structure that is less likely to be damaged by heat that is generated in a bare cell.

An exemplary embodiment provides a rechargeable battery including a bare cell including a case, an electrode assembly, and a cap plate, a protective circuit module that is electrically connected to the bare cell, a protection element that is installed between the bare cell and the protective circuit module and that is electrically connected to the bare cell and the protective circuit module, a protection element cover member that is positioned between the protection element and the protective circuit module and that covers the protection element, and a protection element coupling member that is positioned between the bare cell and the protection element and in which the protection element is attached to an upper surface of the coupling member when a lower surface is attached to the bare cell, wherein the protection element coupling member includes a protection element coupling member body that is coupled to the cap plate and the cap plate coupling protrusion, and the cap plate coupling protrusion is coupled to a protruded portion that is formed in the cap plate.

In this way, according to an aspect of the described technology, separation of a protection element coupling member to which a protection element is attached by an outside impact can be inhibited.

In another aspect, the present invention comprises a rechargeable battery comprising a bare cell having a case and an electrode assembly positioned within the case and a cap plate wherein the cap plate has an electrode and a coupling protrusion extending outward therefrom. In this aspect, the invention further comprises a protection element member for protecting the bare cell and a protection circuit module that is electrically connected to the bare cell via the protection element member. In this aspect, the invention further includes a coupling member that is interposed between the bare cell and the protection element member wherein the coupling protrusions engages with the coupling member so as to retain the coupling member on the cap plate.

Further, according to another aspect of the described technology, damage of a protection element by a heat that is generated in a bare cell can be prevented.

DETAILED DESCRIPTION

Figure 1:
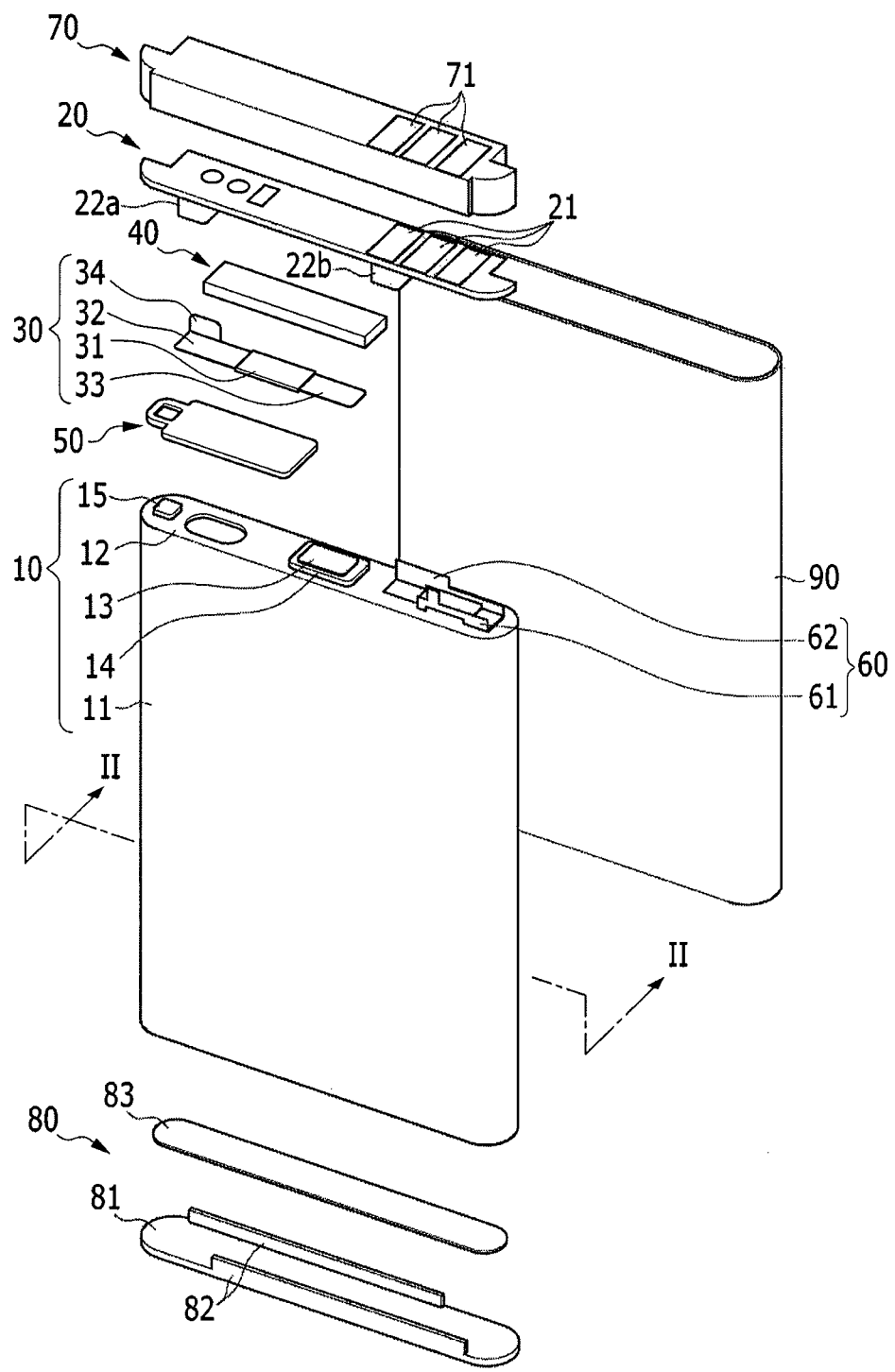
FIG. 1 is an exploded perspective view illustrating a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, for better understanding and ease of description, thicknesses of some layers and areas are excessively displayed. When a layer or an element is referred to as being "on" another layer or a base, it means the layer or the element is directly on the another layer or a base or above the another layer or the base with at least one intermediate layer. When a layer is referred to as being "under" another layer, it means the layer is directly on the another layer or above the another layer with at least one intermediate layer. Furthermore, when one layer exists "between" two layers, the one layer is a single layer between two layers or at least one another layer is interposed between two layers. Like reference numerals designate like elements throughout the specification and drawings.

Figure 2:
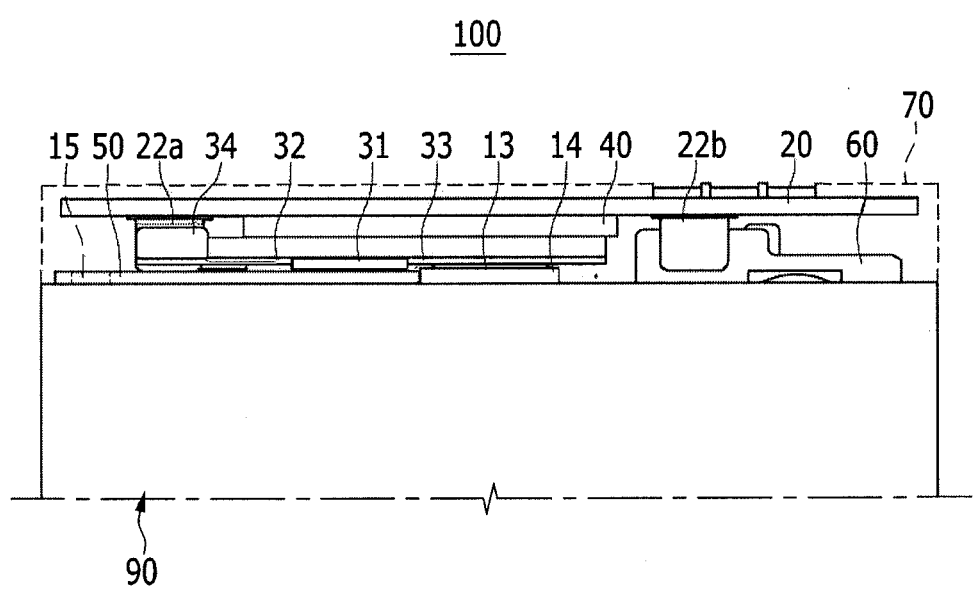
FIG. 2 is a cross-sectional view illustrating a rechargeable battery taken along line II-II of FIG. 1.

FIG. 1 is an exploded perspective view illustrating a rechargeable battery according to a first exemplary embodiment of the present invention, and FIG. 2 is a cross-sectional view illustrating a rechargeable battery taken along line II-II of FIG. 1.

Referring to FIGS. 1 and 2, a rechargeable battery 100 according to the present exemplary embodiment includes a bare cell 10, a protective circuit module 20, a protection element 30, a protection element cover member 40, a protection element coupling member 50, a lead plate 60, an upper cover 70, a lower cover 80, and an exterior label 90.

The bare cell 10 according to the present exemplary embodiment includes a case 11 that houses an electrode assembly (not shown), a cap plate 12 that is installed in an opening of the case 11, an electrode terminal 13 that is installed in the cap plate 12, and a gasket 14 that insulates the electrode terminal 13 and the cap plate 12.

Further, the rechargeable battery 100 according to the present exemplary embodiment further includes a fixing protrusion 15 that is protruded from the cap plate 12.

The case 11 is formed in an approximately rectangular parallelepiped shape and has an opening at one surface thereof. Therefore, in the case 11, an electrode assembly (not shown) including the first and second electrodes (not shown) and a separator (not shown) is received. Here, the first and second electrodes (not shown) may be one of a positive electrode and a negative electrode.

However, a shape of the case 11 is not limited to a cuboid and the case 11 may be formed in various shapes such as a cylindrical shape and a pouch shape.

Further, the cap plate 12 may be formed in a thin plate having electric conductivity and is coupled to an opening of the case 11 to close and seal an opening.

Here, the cap plate 12 is electrically connected to one of the first electrode (not shown) and the second electrode (not shown) to have polarity of a positive electrode or a negative electrode. Hereinafter, for better comprehension and ease of description, the case 11 according to the present exemplary embodiment is electrically connected to the first electrode (not shown).

Further, the electrode terminal 13 is electrically connected to the second electrode (not shown). Here, the gasket 14 that is made of an insulation material (e.g., rubber or resin) is installed between the electrode terminal 13 and the cap plate 12 and electrically insulates the cap plate 12 and the electrode terminal 13.

The protective circuit module 20 according to the present exemplary embodiment includes a protective circuit (not shown), an outer terminal 21, a protection element connection tab 22a, and a lead plate connection tab 22b.

The outer terminal 21 is formed at an upper surface of the protective circuit module 20 and is connected to the outside device.

Further, the protection element connection tab 22a is extended from one side of a lower surface or an upper surface of the protective circuit module 20 to a lower portion and is electrically connected to a protective circuit (not shown). In this case, the protection element connection tab 22a is positioned between a protection circuit (not shown) and the protection element 30 and electrically connects a protective circuit (not shown) and the protection element 30.

Further, the lead plate connection tab 22b is extended from one side of a lower surface or an upper surface of the protective circuit module 20 to a lower portion and is electrically connected to a protective circuit (not shown) or the outer terminal 21. Further, the lead plate connection tab 22b is electrically connected to the lead plate 60 that is electrically connected to the first electrode (not shown).

The protection element 30 according to the present exemplary embodiment includes a protection element body 31, the first lead 32, the second lead 33, and a protection element coupler 34 that is protruded from one side of the first lead 32.

The protection element body 31 is formed with at least one leading wire (not shown) having electric conductivity and that is made of a material (e.g., alloy of lead and tin) to be melted in a predetermined temperature or more and an insulation resin that encloses a leading wire.

However, a material forming a leading wire of the protection element body 31 is not limited to alloys of lead and tin, and a material that may be melted in a temperature of a predetermined temperature or more may be used as a material constituting a leading wire (not shown) of the protection element body 31.

Further, the second lead 33 is electrically connected to the electrode terminal 13, and the first lead 32 is electrically connected to the protective circuit module 20 using the protection element coupler 34 as an intermediary.

Finally, the protective circuit module 20 is electrically connected to the bare cell 10 using the protection element 30 and the electrode terminal 13 as an intermediary.

Therefore, as an overcurrent occurs in the bare cell 10, when a leading wire (not shown) of the protection element body 31 becomes a predetermined temperature or more, the leading wire (not shown) of the protection element body 31 is melted and thus an electrical connection of the bare cell 10 and the protective circuit module 20 is interrupted.

The protection element cover member 40 according to the present exemplary embodiment may be made of a material having electric insulation and heat resistance characteristics (e.g., polyethylene terephthalate (PET) and may be formed in a thin plate shape having a constant thickness.

Further, because the protection element cover member 40 is positioned between the protective circuit module 20 and the protection element 30, an upper surface of the protection element cover member 40 contacts with the protective circuit module 20, and a lower surface that is positioned at a side opposite to an upper surface of the protection element cover member 40 is installed to cover the protection element body 31.

Because the protection element 30 can be coupled to the protection element coupling member 50 that is made of an insulation material according to the present exemplary embodiment, an electrical connection between the protection element 30 and the bare cell 10 can be interrupted.

The lead plate 60 according to the present exemplary embodiment is made of a metal material (e.g., nickel metal or nickel alloy) having electric conductivity.

In more detail, the lead plate 60 includes a lead plate body 61 including a horizontal surface contacting with the cap plate 12 and a lead plate protruded portion 62 that is approximately vertically protruded from the lead plate body 61.

Therefore, the lead plate body 61 is electrically connected to the cap plate 12 by contacting with the cap plate 12, and the lead plate protruded portion 62 is electrically connected to the lead plate connection tab 22b.

Here, the lead plate body 61 is coupled to the cap plate 12 by laser welding or resistance welding, and the lead plate protruded portion 62 is coupled to the lead plate connection tab 22b by laser welding or resistance welding. In this case, because constant space is formed between the bare cell 10 and the protection circuit module 20 by the lead plate protruded portion 62, various elements forming the protective circuit module 20 are positioned.

The upper cover 70 according to the present exemplary embodiment is formed by a hot melt process. That is, the upper cover 70 is formed by injecting a resin that is heated to a predetermined temperature into space between the bare cell 10 and the protective circuit module 20.

Therefore, the upper cover 70 is formed to enclose the protective circuit module 20 and the protection element 30, and the protection element cover member 40 and the protection element coupling member 50 in an upper portion of the bare cell 10.

The lower cover 80 according to the present exemplary embodiment includes a lower cover body 81 and a lower cover protruded portion 82 that is approximately vertically extended from the lower cover body 81.

Further, the lower cover 80 is formed with an insulation resin and is coupled to a lower portion of the bare cell 10 by a lower cover adhesion member 83. Therefore, the lower cover 80 insulates a lower portion of the bare cell 10.

The exterior label 90 according to the present exemplary embodiment is formed with a plate-shaped film including an adhesive layer.

Therefore, the exterior label 90 is adhered to a side surface of the upper cover 70, the bare cell 10, and the lower cover 80 and securely couples the upper cover 70, the bare cell 10, and the lower cover 80.

Figure 3:
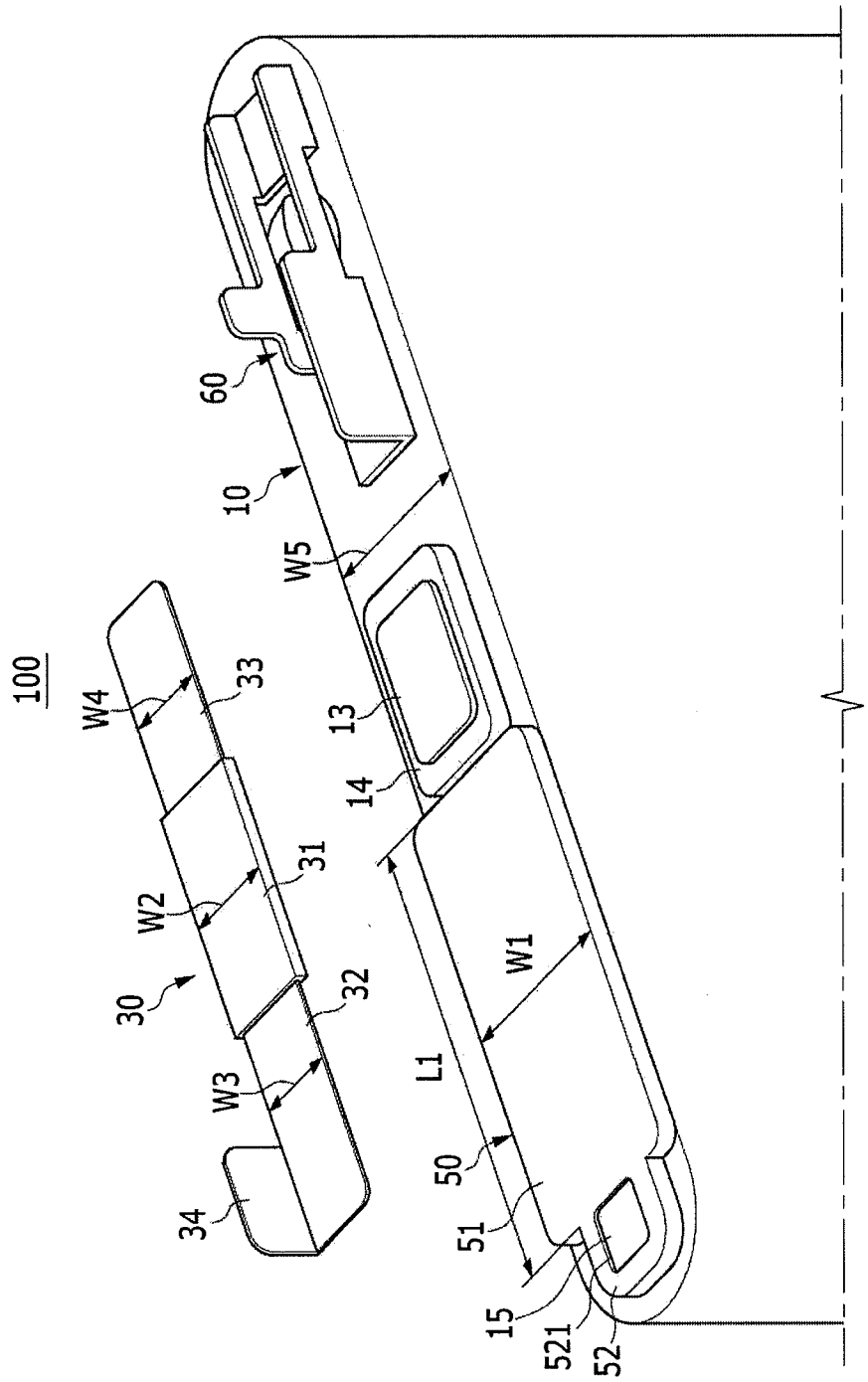
FIG. 3 is a perspective view illustrating a coupling state of a protection element coupling member and a bare cell according to a first exemplary embodiment of the present invention.

FIG. 3 is a perspective view illustrating a coupling state of a protection element coupling member and a bare cell according to a first exemplary embodiment of the present invention.

Referring to FIG. 3, when describing in detail the protection element coupling member 50 according to the present exemplary embodiment, the protection element coupling member 50 includes a protection element coupling member body 51 and a cap plate coupling protrusion 52.

In more detail, the protection element coupling member body 51 according to the present exemplary embodiment may be made of a material having electric insulation and heat resistance (e.g., polyethylene terephthalate (PET)) and may be formed in a thin plate shape having a constant thickness. Further, the protection element coupling member body 51 is made of an elastic material.

In this case, an adhesive material is applied at an upper surface and a lower surface of the protection element coupling member body 51. Therefore, the protection element coupling member body 51 functions as a double-sided adhesive tape.

Therefore, a lower surface of the protection element 30 is attached to an upper surface to which adhesives of the protection element coupling member body 51 are applied, and the lower surface to which adhesives of the protection element coupling member body 51 are applied is attached to an upper surface of the bare cell 10.

Further, a width W1 of the protection element coupling member body 51 is formed in a width larger than each width W2, W3, and W4 of the protection element 30 including the protection element body 31, the first lead 32, and the second lead 33. In this case, it is preferable that the width W1 of the protection element coupling member body 51 is formed in approximately the same size as or a size smaller than the width W5 of the cap plate 12.

Further, one end of the protection element coupling member body 51 is installed to directly contact with the gasket 14. Therefore, a length L1 of the protection element coupling member body 51 may be approximately equal to a distance between the protruded portion 15 and a gasket.

Finally, the protection element coupling member body 51 is positioned between the bare cell 10 and the protection element 30 and intercepts an electrical connection between the protection element 30 and the bare cell 10.

Further, the protection element coupling member body 51 according to the present exemplary embodiment enables the protection element 30 to be stably fixed between the bare cell 10 and the protective circuit module 20.

The cap plate coupling protrusion 52 according to the present exemplary embodiment is protruded from one end of the protection element coupling member body 51. In this case, in the cap plate coupling protrusion 52, a cap plate coupling hole 521 to penetrate the cap plate coupling protrusion 52 is formed.

Further, in the cap plate 12 according to the present exemplary embodiment, the protruded portion 15 to which the cap plate coupling hole 521 is to be coupled is formed, and the protruded portion 15 can be inserted into the cap plate coupling hole 521.

Further, because an adhesive material is applied at a lower surface of the cap plate coupling protrusion 52, the cap plate coupling protrusion 52 may be adhered to the cap plate 12.

Finally, because the protection element coupling member body 51 and the cap plate coupling protrusion 52 are each coupled to the cap plate 12, the protection element coupling member 50 can be more securely fixed to the cap plate 12.

Further, according to the present exemplary embodiment, in order to form the upper cover 70, when a melted resin of an insulation property is filled on the protection element coupling member 50, a resin is filled at a periphery of the cap plate coupling protrusion 52.

Therefore, according to the present exemplary embodiment, because a compressing area of the protection element coupling member 50 increases by a resin constituting the upper cover 70, the protection element coupling member 50 can be more securely fixed to the cap plate 12.

Further, according to the present exemplary embodiment, because a resin for forming the upper cover 70 may be filed between the protruded portion 15 that is protruded from the cap plate 12 and the cap plate coupling hole 521, a bonding force of the upper cover 70 and the cap plate 12 increases.

Therefore, the protection element coupling member 50 that is coupled to the protruded portion 15 that is enclosed by a resin can be more securely fixed to the cap plate 12.

Finally, according to the present exemplary embodiment, as the rechargeable battery 100 is dropped from a high location or a distortional warping stress is exerted against the rechargeable battery 100, even if the rechargeable battery 100 is bent, the protection element coupling member 50 can be inhibited from separating from the bare cell 10 and thus mechanical strength of the rechargeable battery 100 can be increased.

Figure 4:
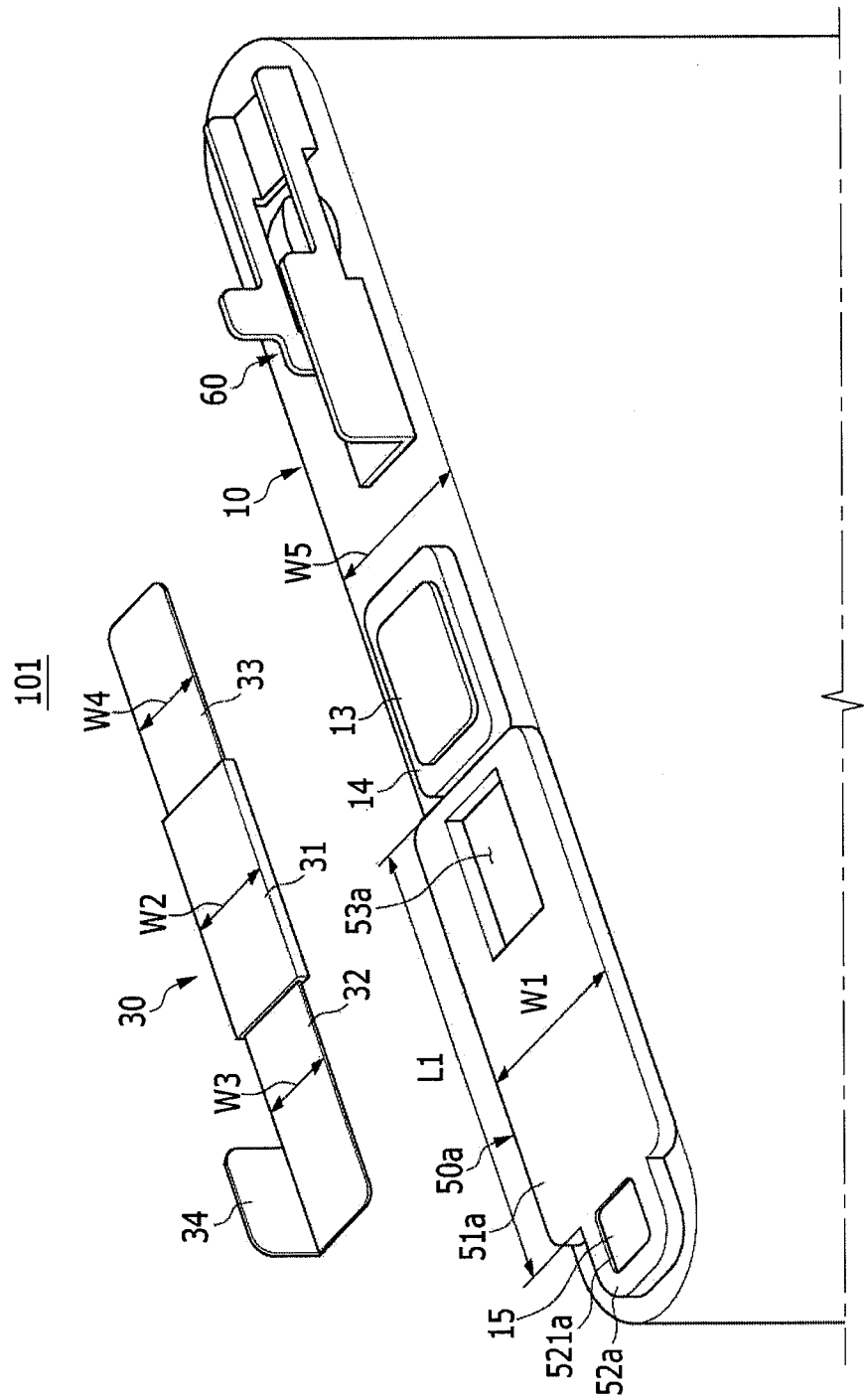
FIG. 4 is a perspective view illustrating a rechargeable battery according to another exemplary variation of a first exemplary embodiment of the present invention.

FIG. 4 is a perspective view illustrating a rechargeable battery according to another exemplary variation of a first exemplary embodiment of the present invention.

Referring to FIG. 4, the rechargeable battery 101 according to the present exemplary embodiment includes the same constituent elements as those according to a first exemplary embodiment of the present invention, except for a protection element coupling member 50a. Therefore, in the present exemplary embodiment, a description of the same constituent elements as those of the first exemplary embodiment will be omitted.

The protection element coupling member 50a according to the present exemplary embodiment includes a protection element coupling member body 51a, a cap plate coupling protrusion 52a, and a through-hole 53a.

However, the protection element coupling member body 51a and the cap plate coupling protrusion 52a according to the present exemplary embodiment have the same structure as that of the protection element coupling member body 51 and the cap plate coupling protrusion 52 of the protection element coupling member 50 according to the first exemplary embodiment. Therefore, hereinafter, a detailed description of the protection element coupling member 50a and the cap plate coupling protrusion 52a will be omitted.

The through-hole 53a according to the present exemplary embodiment penetrates from a lower surface to an upper surface of the protection element coupling member body 51a.

In this case, it is preferable that the through-hole 53a is formed in a portion in which the protection element body 31 is coupled to the protection element coupling member 50a and is formed in approximately the same size as that of the protection element body 31.

Therefore, as shown in FIG. 4, a lower surface of the protection element body 31 can be installed directly opposite to the cap plate 12 of the bare cell 10.

Finally, a heat that is generated in the bare cell 10 by an overcurrent can be more effectively transferred to the protection element coupling member body 51a of the protection element coupling member 50a through the cap plate 12.

However, a shape of the through-hole 53a is not limited to a quadrangular shape, as in the present exemplary embodiment, and the through-hole 53a may have a round shape or a triangular shape that can transfer a heat that is generated in the bare cell 10.

Further, a heat transfer member (not shown) can be inserted into the through-hole 53a according to the present exemplary embodiment and may transfer a heat that is generated in the bare cell 10 to the protection element coupling member body 51a.

Figure 5:
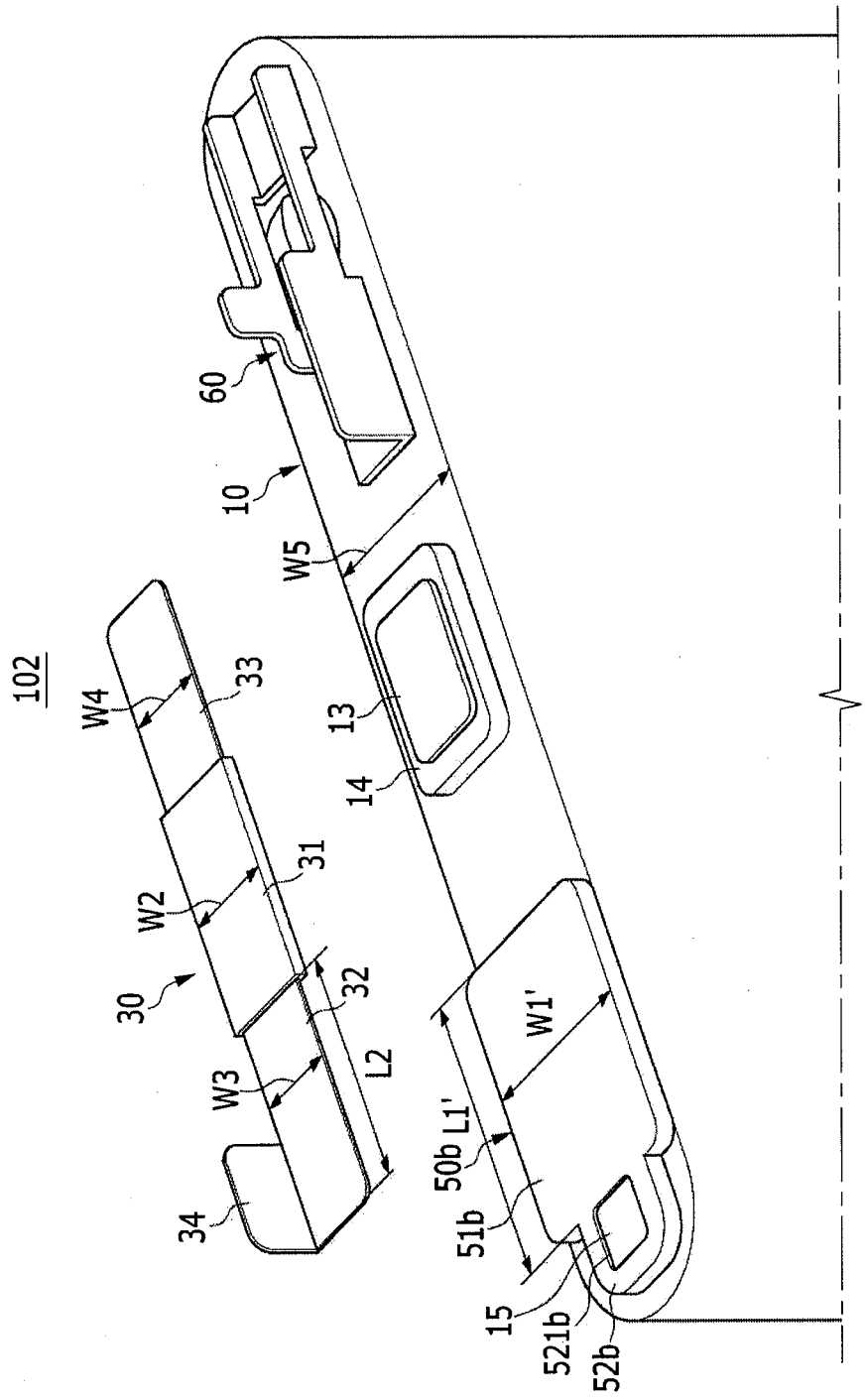
FIG. 5 is a perspective view illustrating a rechargeable battery according to another exemplary variation of a first exemplary embodiment of the present invention.

FIG. 5 is a perspective view illustrating a rechargeable battery according to another exemplary variation of a first exemplary embodiment of the present invention.

Referring to FIG. 5, a rechargeable battery 102 according to the present exemplary embodiment includes the same constituent elements as those according to a first exemplary embodiment of the present invention, except for a protection element coupling member 50b. Therefore, in the present exemplary embodiment, a description of the same constituent elements as those of the first exemplary embodiment will be omitted.

The protection element coupling member 50b according to the present exemplary embodiment includes a protection element coupling member body 51b and a cap plate coupling protrusion 52b having a cap plate coupling hole 521b.

However, the cap plate coupling protrusion 52b according to the present exemplary embodiment has the same configuration as that of the cap plate coupling protrusion 52 of the first exemplary embodiment and therefore a detailed description of the cap plate coupling protrusion 52b having the cap plate coupling hole 521b will be omitted.

A width W1' of the protection element coupling member body 51b according to the present exemplary embodiment may have a width larger than each width W2, W3, and W4 of the protection element 30 including the protection element body 31, the first lead 32, and the second lead 33. In this case, it is preferable that the width W1' of the protection element coupling member body 51b is formed in approximately the same size as or a width smaller than a width W5 of the cap plate 12.

Further, a length L1' of the protection element coupling member body 51b may be formed approximately the same as or smaller than a length L2 of the first lead 32.

Therefore, according to the present exemplary embodiment, space in which the protection element coupling member body 51b may be installed directly opposite to the bare cell 10 may be formed between the protection element 30 and the gasket 14.

Finally, the first lead 32 is adhered to the protection element coupling member body 51b, the second lead 33 contacts with the electrode terminal 13, and the protection element body 31 is positioned between the bare cell 10 and the protection element cover member 40.

Therefore, a heat that is generated by an overcurrent in the bare cell 10 can be effectively transferred to the protection element body 31 through space that is formed between the protection element body 31 and the bare cell 10.

Figure 6:
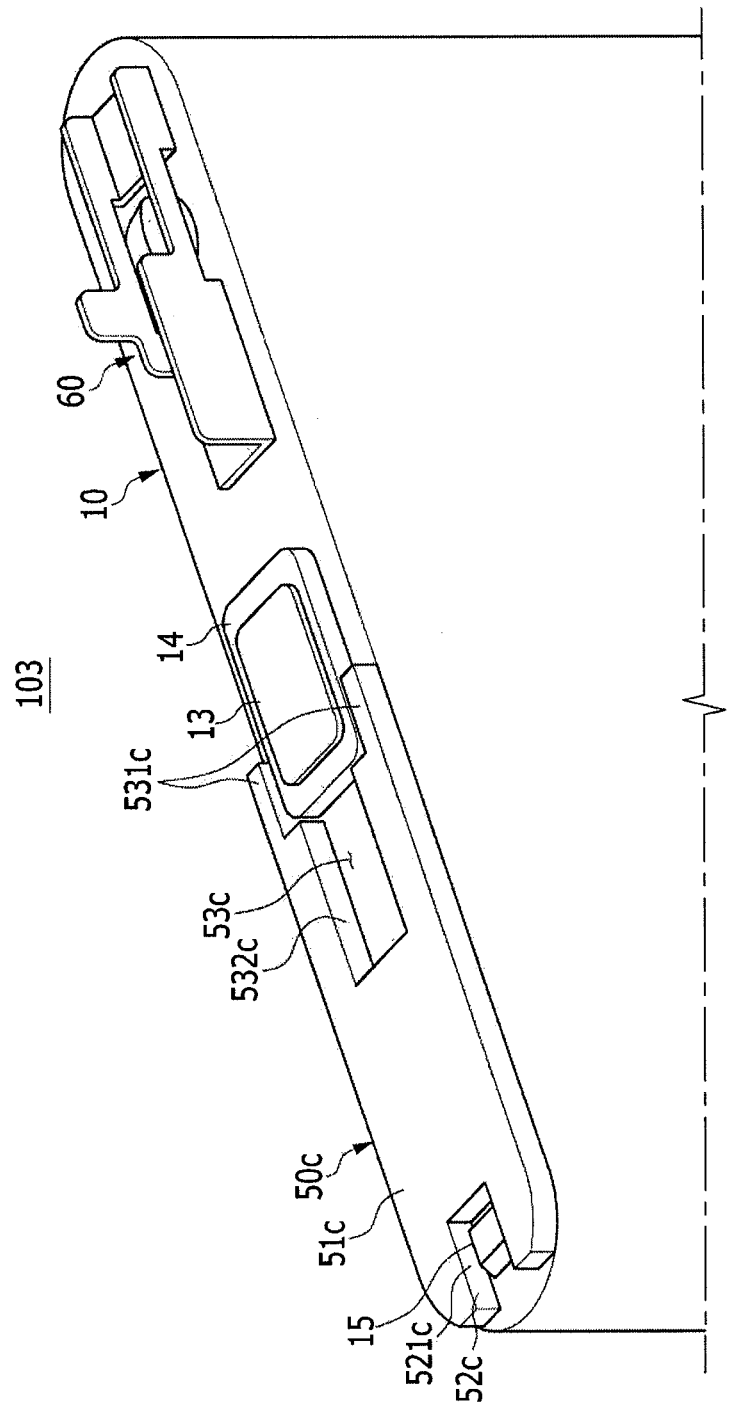
FIG. 6 is a perspective view illustrating a rechargeable battery according to another exemplary variation of a first exemplary embodiment of the present invention.

FIG. 6 is a perspective view illustrating a rechargeable battery according to another exemplary variation of a first exemplary embodiment of the present invention.

Referring to FIG. 6, a rechargeable battery 103 according to the present exemplary embodiment includes the same constituent elements as those of the rechargeable battery 101 according to an exemplary variation of a first exemplary embodiment of the present invention, except for a protection element coupling member 50c. Therefore, in the present exemplary embodiment, a description of the same constituent elements as those of the rechargeable battery 101 in an exemplary variation of the first exemplary embodiment will be omitted.

The protection element coupling member 50c according to the present exemplary embodiment includes a protection element coupling member body 51c, a cap plate coupling protrusion 52c, and an electrode terminal coupling groove 53c.

Here, the protection element coupling member body 51c has the same configuration as that of the protection element coupling member body 51a according to an exemplary variation of the first exemplary embodiment of the present invention and therefore a detailed description of the protection element coupling member body 51c according to the present exemplary embodiment will be omitted.

A protruded portion coupling groove 521c may be formed in one end portion of the cap plate coupling protrusion 52c according to the present exemplary embodiment, and an opening may be formed in one end of the protruded portion coupling groove 521c.

Therefore, as shown in FIG. 6, a protruded portion 15 that is formed in the cap plate 12 is coupled in a forced insertion method to an opening of the protruded portion coupling groove 521c. Here, it is preferable that a size of an opening of the protruded portion coupling groove 521c is formed approximately the same as or a little larger than a size of the protruded portion 15.

Finally, because the protection element coupling member 50c is fixed to the protruded portion 15 that is formed on the cap plate 12, the protection element coupling member 50c can be securely fixed to the bare cell 10.

Further, because a resin for forming the upper cover 70 may be filled between the cap plate coupling groove 521c and the protruded portion 15 that is protruded on the cap plate 12, a bonding force of the upper cover 70 and the cap plate 12 can increase.

Therefore, the protection element coupling member 50c that is coupled and fixed to the protruded portion 15 can be more stably fixed to the bare cell 10.

The electrode terminal coupling groove 53c according to the present exemplary embodiment may be formed in one surface opposite to the electrode terminal 13. In this case, an opening may be formed in one surface opposite to the electrode terminal coupling groove 53c.

Further, the electrode terminal coupling groove 53c includes a first groove portion 531c that inserts the electrode terminal 13 and a second groove portion 532c that is formed in a portion opposite to the protection element body 31.

However, the second groove portion 532c has a configuration similar to the through-hole 53a of the rechargeable battery 101 according to another exemplary variation of the first exemplary embodiment of the present invention and therefore a detailed description of the second groove portion 532c will be omitted.

Therefore, because the protection element coupling member 50c according to the present exemplary embodiment is coupled to and is supported by the electrode terminal 13, the protection element coupling member 50c can be more securely fixed to the bare cell 10.

Further, a resin for forming the upper cover 70 may be filled at a periphery of the first groove portion 531c.

Therefore, because an area in which the protection element coupling member 50c is compressed by a resin forming the upper cover 70 increases, the protection element coupling member 50c can be more securely fixed to the cap plate 12.

Finally, according to the present exemplary embodiment, as the rechargeable battery 103 drops from a high location or a distortional warping stress operates in the rechargeable battery 103, even if the rechargeable battery 103 is bent, separation of the protection element coupling member 50c from the bare cell 10 can be inhibited and thus mechanical strength of the rechargeable battery 103 can be improved.

Figure 7:
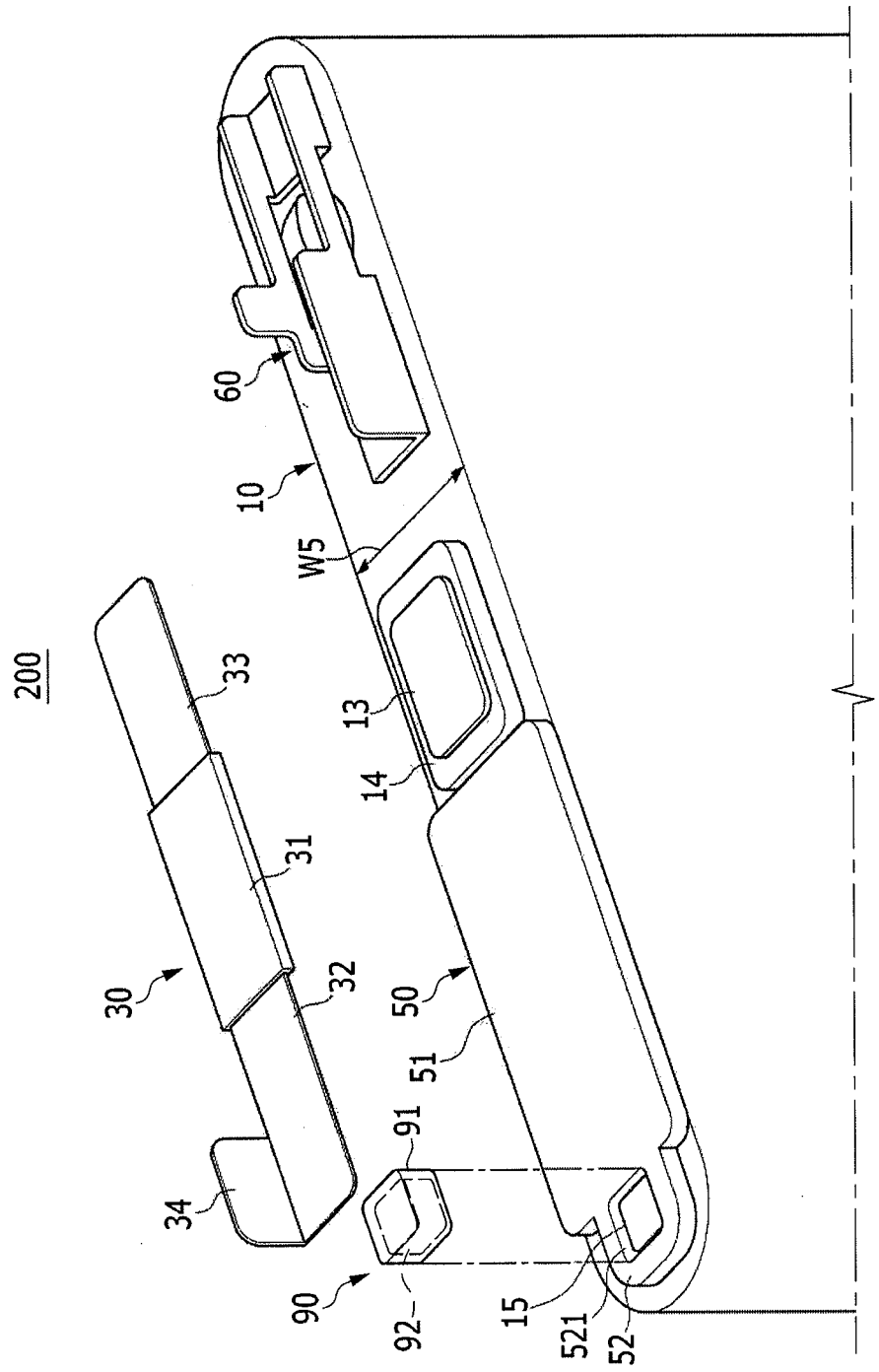
FIG. 7 is a perspective view illustrating a coupling state of a protection element coupling member and a bare cell according to a second exemplary embodiment of the present invention.

FIG. 7 is a perspective view illustrating a coupling state of a protection element coupling member and a bare cell according to a second exemplary embodiment of the present invention.

Referring to FIG. 7, a rechargeable battery 200 according to the present exemplary embodiment includes the same constituent elements as those of the rechargeable battery 100 according to the first exemplary embodiment of the present invention, except for a support member 90. Therefore, in the present exemplary embodiment, a description of the same constituent elements as those of the first exemplary embodiment will be omitted.

The support member 90 according to the present exemplary embodiment includes a support member body 91 and a protruded portion coupling groove 92 that is formed in the support member body 91.

As shown in FIG. 7, the protruded portion coupling groove 92 of the support member 90 is inserted into and fixed to the protruded portion 15 that is formed on the cap plate 12.

Therefore, a cap plate coupling protrusion 52 of the protection element coupling member 50 can be more securely fixed to the bare cell 10.

Further, when the cap plate coupling protrusion 52 of the protection element coupling member 50 is coupled to a support member 90, a resin for forming the upper cover 70 is filled at a periphery of the support member 90 and thus an area in which the protection element coupling member 50 is compressed by the upper cover 70 can increase.

Therefore, the protection element coupling member 50 that is coupled to the support member 90 can be more stably fixed to the bare cell 10.

Finally, according to the present exemplary embodiment, as the rechargeable battery 200 drops from a higher location or a distortional warping stress operates in the rechargeable battery 200, even if the rechargeable battery 200 is bent, the protection element coupling member 50 is inhibited from being separated from the bare cell 10 and thus mechanical strength of the rechargeable battery 200 can be improved.

Figure 8:
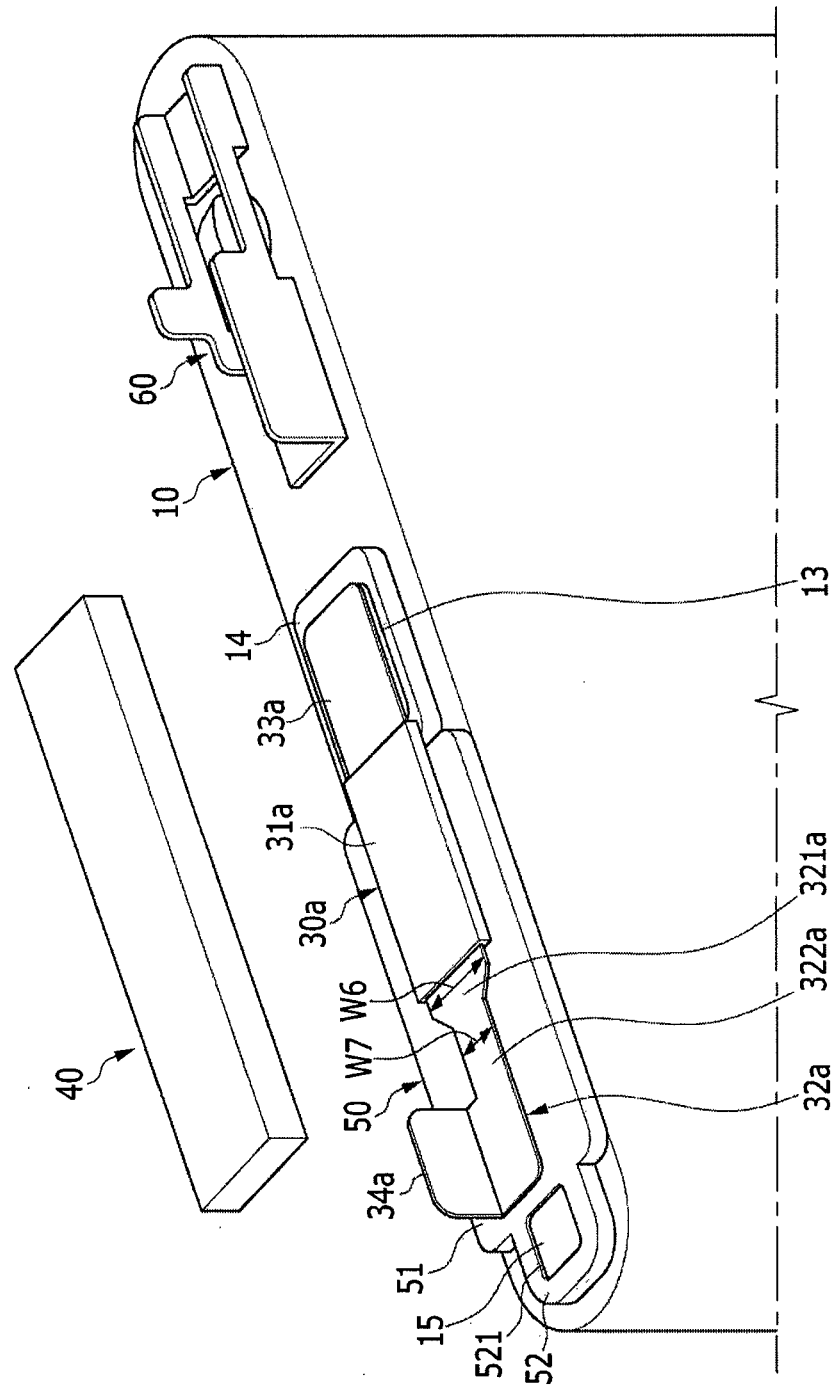
FIG. 8 is a perspective view illustrating a coupling state of a protection element and a protection element coupling member according to a third exemplary embodiment of the present invention.

FIG. 8 is a perspective view illustrating a coupling state of a protection element and a protection element coupling member according to a third exemplary embodiment of the present invention.

Referring to FIG. 8, a rechargeable battery 300 according to the present exemplary embodiment has the same configuration as that of the rechargeable battery 100 according to the first exemplary embodiment of the present invention, except for a protection element 30a. Therefore, in the present exemplary embodiment, a description of the same constituent elements as those of the first exemplary embodiment will be omitted.

The protection element 30a according to the present exemplary embodiment includes a protection element body 31a, a first lead 32a, a second lead 33a, and a protection element coupler 34a.

However, the protection element body 31a, the second lead 33a, and the protection element coupler 34a according to the present exemplary embodiment have the same configuration as that of the protection element body 31, the second lead 33, and the protection element coupler 34 of the protection element 30 according to the first exemplary embodiment of the present invention, and hereinafter, a detailed description of the protection element body 31a, the second lead 33a, and the protection element coupler 34a will be omitted.

The first lead 32a according to the present exemplary embodiment includes a first lead body 321a and a first lead groove portion 322a.

In more detail, one end of the first lead body 321a is integrally coupled to the protection element body 31a, and the first lead groove portion 322a is extended from the first lead body 321a.

Here, because a width W6 of the first lead body 321a may be formed larger than a width W7 of the first lead groove portion 322a, the first lead 32a may have a groove by the first lead groove portion 322a.

That is, because an area of the first lead 32a reduces by an area of the formed groove, in a state where an overcurrent is not generated, an amount of a heat to be transferred to the protection element 30a by passing through the first lead 32a in the bare cell 10 may be reduced.

Therefore, according to the present exemplary embodiment, in a state where an overcurrent is not generated, a damage probability of the protection element 30*a* by a heat that is generated in the bare cell 10 may be reduced.

Further, a contact area of the protection element cover member 40 and the protection element coupling member 50 can increase by a difference between a width W6 of the first lead body 321*a* and a width W7 of the first lead groove portion 322*a*.

Therefore, the protection element 30*a* according to the present exemplary embodiment can be fixed between the protection element cover member 40 and the protection element coupling member 50 more stably than a case where a width of the first lead body 321*a* and a width of the first lead groove portion 322*a* are the same.

Although the foregoing has shown illustrated and described various embodiments and uses of the present invention, it will be apparent that various changes, substitutions and modifications in the form and the use of the present invention can be made by those skilled in the art without departing from the spirit of the present invention. Hence, the scope of the present invention should not be limited to the foregoing discussion but should be defined by the appended claims.

What is claimed is:

1. A rechargeable battery comprising:
a bare cell having a case and an electrode assembly positioned within the case and a cap plate, wherein the cap plate has an electrode and a coupling protrusion extending outward therefrom wherein the coupling protrusion is spaced from the electrode on the cap plate;
a protection element for protecting the bare cell;
a protection circuit module that is electrically connected to the bare cell via the protection element;
a coupling member that is interposed between the bare cell and the protection element, wherein the coupling protrusion engages with the coupling member so as to retain the coupling member on the cap plate and wherein the coupling member includes a portion that is positioned on the cap plate between the coupling protrusion and the electrode wherein the cap plate defines a first and a second end and wherein the electrode of the cap plate is located spaced from the first end of the cap plate and wherein the coupling protrusion is located adjacent the first end.

2. The battery of claim 1, wherein the coupling member defines a recess that receives the coupling protrusion of the cap plate.

3. The battery of claim 1, further comprising a support member having a support member body and a groove that receives the coupling protrusion so that the support member is coupled to the coupling protrusion.

4. The battery of claim 1, wherein the protection element is adhered to the coupling member.

5. The battery of claim 1, wherein the protection element has a first width and wherein the coupling member has a second width that is greater than the first width.

6. The battery of claim 1, wherein the coupling member extends substantially between the first end and the electrode of the cap plate.

7. The battery of claim 6, wherein the coupling member defines two protrusions that define a recess that receives a portion of the electrode of the cap plate.

8. The battery of claim 6, wherein the coupling member defines an opening that is interposed between the electrode on the cap plate and the recess that receives the coupling protrusion so that the protection element is exposed to a portion of the cap plate.

9. The battery of claim 1, wherein the protection element extends from the first end of the cap plate to a location spaced from the electrode of the cap plate so that a portion of the cap plate is exposed to the protection element.

10. The battery of claim 1, wherein the protection element has a first lead that is coupled to the protection circuit module and a second lead that is coupled to the electrode of the cap plate.

11. The battery of claim 10, wherein the protection element is positioned within a body that is interposed between the first and the second leads.

12. The battery of claim 10, wherein the protection element body has a first width and the first lead has a second width less than the first width.

13. The battery of claim 1, wherein the protection element has a vertically extending portion that is coupled to the first lead so as to extend upwards toward the protection circuit module so that the protection module is elevated above the protection element to define a space therebetween.

14. The battery of claim 13, further comprising a top cover member that is formed of a flowable resin and wherein the flowable resin extends into the space between the protection module and the protection element.

15. The battery of claim 14, wherein the protection element is elevated with respect to the cap plate to define a space therebetween and wherein the flowable resin of the cover extends into the space between the protective element and the coupling member.

16. The battery of claim 1, wherein the coupling member has a first end and wherein the recess that receives the coupling protrusion comprises an opening that is spaced from the first end.

17. The battery of claim 1, wherein the coupling member has a first end and wherein the recess that receives the coupling protrusion comprises an opening that is open on the first end of the coupling member.

* * * * *